(12) United States Patent
Mei

(10) Patent No.: US 7,719,797 B1
(45) Date of Patent: *May 18, 2010

(54) MULTI-STEP SHOCK LIMITER FOR HEAD GIMBAL ASSEMBLY

(75) Inventor: Shijin Mei, Murrieta, CA (US)

(73) Assignee: Magnecomp Corporation, Murrieta, CA (US)

( * ) Notice: Subject to any disclaimer, the term of this patent is extended or adjusted under 35 U.S.C. 154(b) by 1163 days.

This patent is subject to a terminal disclaimer.

(21) Appl. No.: 11/199,801

(22) Filed: Aug. 8, 2005

(51) Int. Cl.
*G11B 21/21* (2006.01)
(52) U.S. Cl. .................................. 360/245.7
(58) Field of Classification Search ............... 360/245.7
See application file for complete search history.

(56) References Cited

U.S. PATENT DOCUMENTS

| | | | |
|---|---|---|---|
| 5,526,205 A | 6/1996 | Aoyagi et al. |
| 5,771,136 A | 6/1998 | Girard |
| 5,815,349 A | 9/1998 | Frater |
| 5,838,517 A | 11/1998 | Frater et al. |
| 5,930,079 A | 7/1999 | Vera et al. |
| 5,930,080 A | 7/1999 | Frater et al. |
| 5,959,807 A | 9/1999 | Jurgenson |
| 5,987,733 A | 11/1999 | Goss |
| 6,021,022 A | 2/2000 | Himes et al. |
| 6,046,883 A | 4/2000 | Miller |
| 6,067,209 A | 5/2000 | Aoyagi et al. |
| 6,069,773 A | 5/2000 | Frater et al. |
| 6,137,657 A | 10/2000 | Coon et al. |
| 6,147,839 A | 11/2000 | Girard |
| 6,172,853 B1 | 1/2001 | Davis et al. |
| 6,181,525 B1 | 1/2001 | Carlson |
| 6,191,915 B1 | 2/2001 | Takagi et al. |
| 6,195,237 B1 | 2/2001 | Perez |
| 6,233,121 B1 | 5/2001 | Pan |
| 6,243,235 B1 | 6/2001 | Fu et al. |
| 6,266,212 B1 | 7/2001 | Coon |
| 6,320,729 B1 | 11/2001 | Coon |
| 6,327,118 B1 | 12/2001 | Perez |
| 6,367,145 B1 | 4/2002 | Coon et al. |
| 6,373,664 B1 | 4/2002 | Coon et al. |
| 6,388,843 B1 | 5/2002 | Takagi et al. |
| 6,417,986 B1 | 7/2002 | Tran et al. |
| 6,417,996 B1 | 7/2002 | Budde |
| 6,424,498 B1 | 7/2002 | Patterson et al. |
| 6,426,851 B1 | 7/2002 | Perez |
| 6,445,546 B1 | 9/2002 | Coon |

(Continued)

*Primary Examiner*—Craig A. Renner
(74) *Attorney, Agent, or Firm*—Intellectual Property Law Offices of Joel D. Voelzke, APC

(57) ABSTRACT

A multi-step shock limiter in a disk drive suspension assembly has a load beam and a flexure, with a plurality of limiting pairs. A first limiting pair has a clearance less than that of any other limiting pair, and is flexible. During a shock condition, vertical movement of the flexure with respect to the load beam causes the first limiting pair to engage and absorb shock. Further movement engages at least one additional pair, redistributing the shock thereamong until all pairs engage, thereby substantially anchoring the flexure to the load beam and limiting further movement of the flexure. The limiters may comprise a double tee shape having two legs and a cross member, with the first limiter defined by the cross member between the legs, and two additional limiters defined by the ends of the cross member that extend beyond the legs. The limiters engage corresponding tabs or tongues.

38 Claims, 8 Drawing Sheets

U.S. PATENT DOCUMENTS

| | | |
|---|---|---|
| 6,504,684 B1 | 1/2003 | Danielson et al. |
| 6,533,950 B1 | 3/2003 | Shum et al. |
| 6,549,372 B1 | 4/2003 | Chen et al. |
| 6,549,375 B1 | 4/2003 | Crane et al. |
| 6,560,074 B2 | 5/2003 | Gillis et al. |
| 6,587,309 B2 | 7/2003 | Nojima |
| 6,667,856 B2 | 12/2003 | Danielson et al. |
| 6,714,386 B1 | 3/2004 | Polycarpou et al. |
| 6,791,798 B1 | 9/2004 | Mei |
| 2003/0086207 A1 | 5/2003 | Watadani et al. |

MULTI-STEP SHOCK LIMITER FOR HEAD GIMBAL ASSEMBLY

BACKGROUND

1. Field of the Invention

The present invention relates generally to suspension systems for shock absorption. More specifically, the present invention relates to systems and methods to for limiting shock in a disk drive head suspension assembly employing a multi-step shock limiter.

2. Related Art

A disk drive head suspension, or head gimbal assembly typically comprises a load beam and a flexure, the load beam extending longitudinally from a base plate, and the flexure moveably coupled to the load beam. A read/write head is typically mounted at or near the distal end of the flexure. The read/write head performs the functions of reading data from and writing data onto a disk surface. The minimum distance between the read/write head and the disk surface, also known as lift clearance, affects the operation of the read/write head and is therefore an important design parameter. Thus, disk drive suspensions are preloaded to maintain lift clearance at a desired distance. However, during a shock condition, vertical movement of the flexure may occur, causing the read/write head to impact the disk surface. This action may cause damage to the read/write head, load beam, or flexure, and permanently alter the lift clearance. In severe cases, the impact may damage the disk surface, causing loss of stored data. Shock conditions may result from normal operation, for example, during loading or unloading of a disk. Other sources of shock include non-operational phenomena such as shipping, handling, or installation that cause external jarring or impact to the system.

The current state of the art provides a limiter disposed between the flexure and the load beam to protect the flexure in the event of shock. Under shock conditions, the limiter contacts an engagement surface to dampen shock and prevent excessive damage to the suspension assembly components. However, the limiter itself is generally made of a metal such as stainless steel, and may also be made thinner than the engagement surface. Limiter rigidity is therefore a design concern, especially for short duration shock on the order of 0.5 milliseconds, which can fracture or otherwise deform the limiter. Consequently, the determining factor in the shock rating of the suspension system may depend entirely on the design of the limiter.

In view of the foregoing, there is an ongoing need to improve the performance of limiters in disk drive suspension systems.

SUMMARY

Various embodiments of the present invention provide systems and methods employing a multi-step shock limiter for limiting shock in disk drive head assemblies. A suspension system for a disk drive head includes a baseplate, a flexure, and a load beam. In accordance with a first embodiment of the invention, the load beam is coupled to distal end of the baseplate, and the flexure is coupled to the load beam. The load beam provides one or more engagement surfaces, and the flexure provides a plurality of limiters, each limiter displaced from one of the engagement surfaces. In conditions of shock, a load is exerted on the flexure, resulting in the vertical movement of the read/write head mounted on the flexure. This load, increasing from zero, causes gradual engagement of the one or more engagement surfaces and the plurality of limiters. These engagements absorb the load, and hence, limit the vertical movement of the read/write head caused by the shock.

In another embodiment, each limiter corresponds to at least one engagement surface such that each limiter and its corresponding engagement surface form a limiting pair having a clearance therebetween. In one implementation, at least one limiting pair has less clearance than any other limiting pair. During a shock condition, a load exerted on the flexure causes vertical movement of the flexure such that at least one limiter engages its corresponding engagement surface before engagement of any other limiting pair. During the first engagement, the at least one limiter provides a damping effect to the shock. During subsequent engagements, other limiters on the flexure engage with corresponding engagement surfaces on the load beam to further absorb the shock. In one implementation, a subsequently engaging limiting pair having the greatest clearance substantially anchors the flexure to the load beam. This multi-step shock limiting sequence redistributes the load over a plurality of limiting pairs thereby reducing the risk of damage to the limiters and to other system components.

In another embodiment, the flexure is substantially planar, and at least one limiter comprises a tab extending from the flexure at an angle with respect to the flexure plane. One or more engagement surfaces integral to the load beam may comprise transverse members extending from longitudinal edges of the load beam for engaging a flexure tab during shock. In other embodiments, tabs or tongues in various configurations may extend from the flexure or load beam to form limiting pairs having identical or different clearances.

In one implementation, a substantially planar load beam includes a first longitudinal edge and a second longitudinal edge, one or more transverse members, and one or more hollow areas. The first longitudinal edge and the second longitudinal edge extend in a substantially longitudinal direction from a distal end of the baseplate. Further, the first longitudinal edge and the second longitudinal edge are separated by the one or more transverse members. The transverse members, the first longitudinal edge, and the second longitudinal edge form borders for the one or more hollow areas. The flexure is substantially planar and extends in a substantially longitudinal direction. The flexure may also comprise at least one hollow area.

In another embodiment, the flexure has flexible, resilient, and/or pliant characteristics. The limiters may be formed integrally from the flexure; hence, the limiters may share these same characteristics. Engagement surfaces may be formed integrally from the load beam, and may comprise material harder and/or thicker than a limiter. An engagement surface may comprise a tab or a tongue extending into a hollow interior of the load beam. Each limiter may comprise a tongue or tab extending from the flexure in a substantially longitudinal direction from one of the transverse members of the flexure into one of the hollow areas. In one embodiment, at least one limiter is integral to the flexure. The at least one limiter comprises a member extending at an angle with respect to the flexure plane.

In another embodiment, a substantially planar flexure may comprise a double tee shape extending at an angle with respect to the plane. The double tee shape includes a cross member and two legs extending between the cross member and flexure. The cross member includes an interior limiter located between the legs, a second limiter at one end of the cross member, and a third limiter at an opposite end of the cross member. Each limiter forms a limiting pair with a load beam engagement surface separated from the limiter by a clearance distance. A first engagement surface comprises a tongue extending into a hollow area between the longitudinal edges from a transverse member of the load beam for engaging the interior limiter. A second engagement surface comprises a tab protruding inward from a longitudinal edge of the load beam for engaging the second limiter. A third engagement surface comprises a tab protruding inward from the opposite longitudinal edge of the load beam for engaging the third limiter. In one implementation, the limiting pair comprising the interior limiter and the first engagement surface has the least amount of clearance, such that, during a shock, it engages prior to engagement of any other limiting pair.

In another embodiment, a double tee shape having a cross member and two legs is attached to the load beam. The cross member includes one interior engagement surface located between the legs, a second engagement surface at one end of the cross member, and a third engagement surface at an opposite end of the cross member. Each engagement surface corresponds to a limiter attached to the flexure, thereby forming a plurality of limiting pairs. A center limiter comprising a tongue extends from one end of the flexure for engaging the interior engagement surface. A second limiter comprising a tongue or a tab extends from a side of the flexure for engaging the second engagement surface. A third limiter comprising a tongue or tab extends from a side opposite the second limiter for engaging the third engagement surface. The engagement surfaces are configured for first and second engagement positions, such that, during a shock, at least one limiting pair engages prior to engagement of another limiting pair. In one implementation, this is achieved by providing limiting pairs with different clearances. In one example, different clearances are achieved by varying the height of the cross member at each engagement surface location.

One object of the invention is to provide a shock-resistant suspension system for a disk drive head. Another object of the invention is to improve the shock rating of a disk drive by employing a suspension system that distributes shock load over a plurality of limiters. Another object of the invention is to provide a multi-step suspension system that, under a shock condition, engages at least one shock limiter before engaging one or more other shock limiters.

Related systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

Preferred embodiments of the invention will hereinafter be described in conjunction with the appended drawings provided to illustrate and not to limit the invention. The components in the figures are not necessarily to scale, emphasis instead being placed upon illustrating the principles of the invention. In the figures, like reference numerals designate corresponding parts throughout the different views.

DETAILED DESCRIPTION

The present invention relates to a multi-step shock limiter for improving the shock rating of a disk drive head suspension, or a head gimbal assembly (HGA). The improved disk drive suspensions and shock limiters described herein help to absorb and redistribute shock load, thereby reducing the risk of damage to disk drive components.

Figure 8:
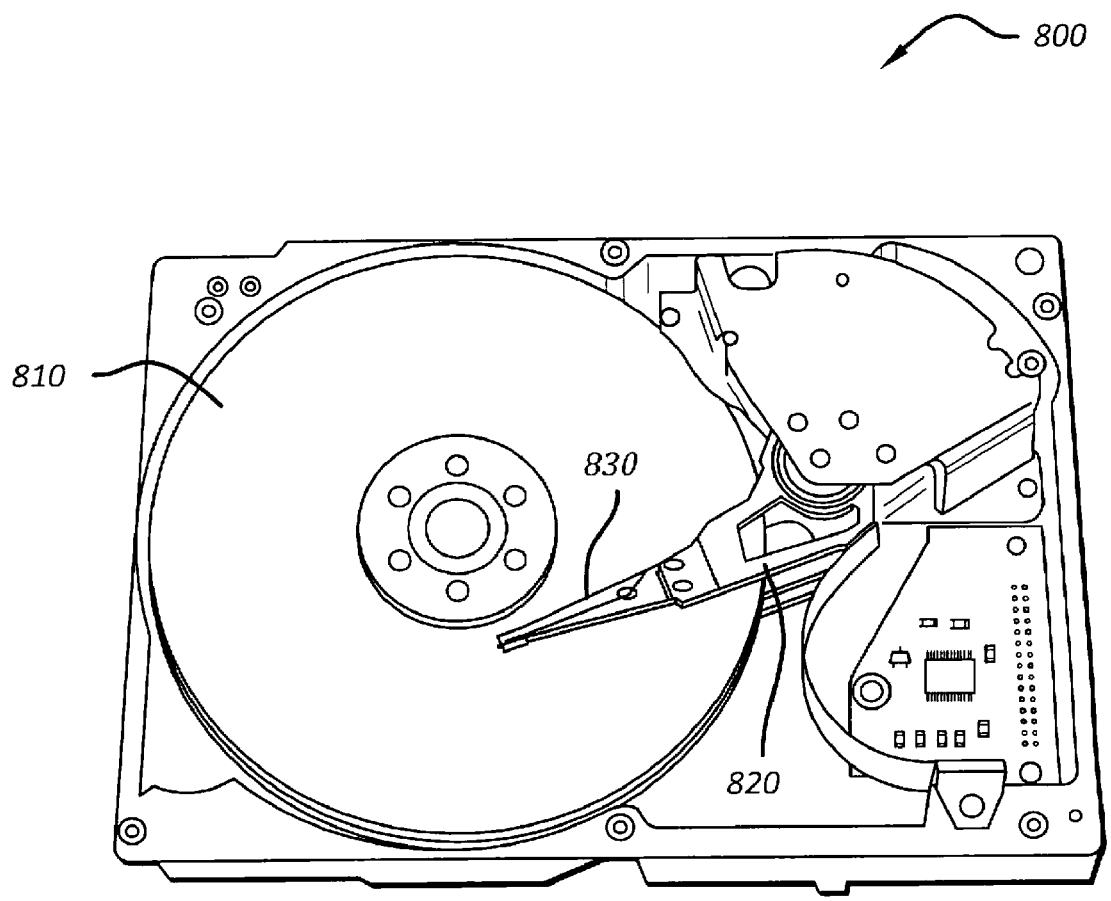
FIG. 8 is a plan view of a simplified conventional disc drive according to the prior art.

The present invention may be used in an otherwise conventional or previously known disc drive, such as disk drive 800 of prior art FIG. 8 which includes data disk 810 and suspension 830 affixed to actuator arm 820.

In accordance with various embodiments of the invention, a disk drive suspension includes a baseplate, a load beam, and a flexure. At its proximal end, the baseplate is attached to an actuator arm. The load beam is coupled to the baseplate, and the flexure is coupled to the load beam. A read/write head is mounted on the flexure, usually at or near a distal end of the load beam. This basic linkage allows the read/write head to be moved to a desired position with respect to a hard disk track by movement of the actuator arm. The present invention focuses primarily on configuring a load beam and flexure for multi-step shock resistance.

In one embodiment of this configuration according to the invention, a substantially planar load beam includes a first longitudinal edge and a second longitudinal edge, one or more transverse members, and one or more hollow areas. The first longitudinal edge and the second longitudinal edge extend in a substantially longitudinal direction from a distal end of the baseplate. Further, the first longitudinal edge and the second longitudinal edge are separated by the one or more transverse members. The transverse members, the first longitudinal edge, and the second longitudinal edge form borders for the one or more hollow areas. A substantially planar flexure extends in a substantially longitudinal direction with respect to the load beam, and is moveably attached thereto. The flexure may also comprise at least one hollow area.

In various embodiments, the load beam is designed to provide one or more engagement surfaces, and the flexure is designed to provide a plurality of limiters. Each limiter is displaced from its corresponding engagement surface by a clearance distance. Each limiter and its corresponding engagement surface form a limiting pair, and among the plurality of limiting pairs, the clearance distances may vary. In conditions of shock, a load is exerted on the flexure, resulting in the vertical movement of the read/write head mounted on the flexure. This load, increasing from zero, causes gradual engagement of each limiting pair. The order in which limiting pairs engage, and the damping force attributable to each, may be a function of the clearance, or of some other dimensional or material parameter. These staggered engagements absorb and distribute the load in multi-step fashion, and in the aggregate, dampen the vertical movement of the read/write head caused by the shock.

For example, in an embodiment having limiting pairs that differ only in clearance, the shock will tend to cause engagement of the limiting pair having the least amount of clearance before causing engagement of any other limiting pair. The first engagement absorbs some of the load and provides a damping effect to the shock. In the first engagement position, the limiter and engagement surface that form the first limiting pair provide a flexible, resilient impact between flexure and load beam, thereby reducing the risk of component fracture. In subsequent engagement positions, subsequent engagements of limiting pairs having greater clearance further absorb and distribute the shock load. Eventually, one or more limiting pairs having the greatest clearance engage after the engagement of all other limiting pairs. This last engagement is less resilient, and substantially anchors the flexure to the load beam. Thus, the gradual, or multi-step engagement of various limiters with corresponding engagement surfaces redistributes and dampens the shock, and subsequently, substantially anchors the flexure to the load beam thereby limiting the vertical movement of the flexure caused by the shock.

Figure 1:
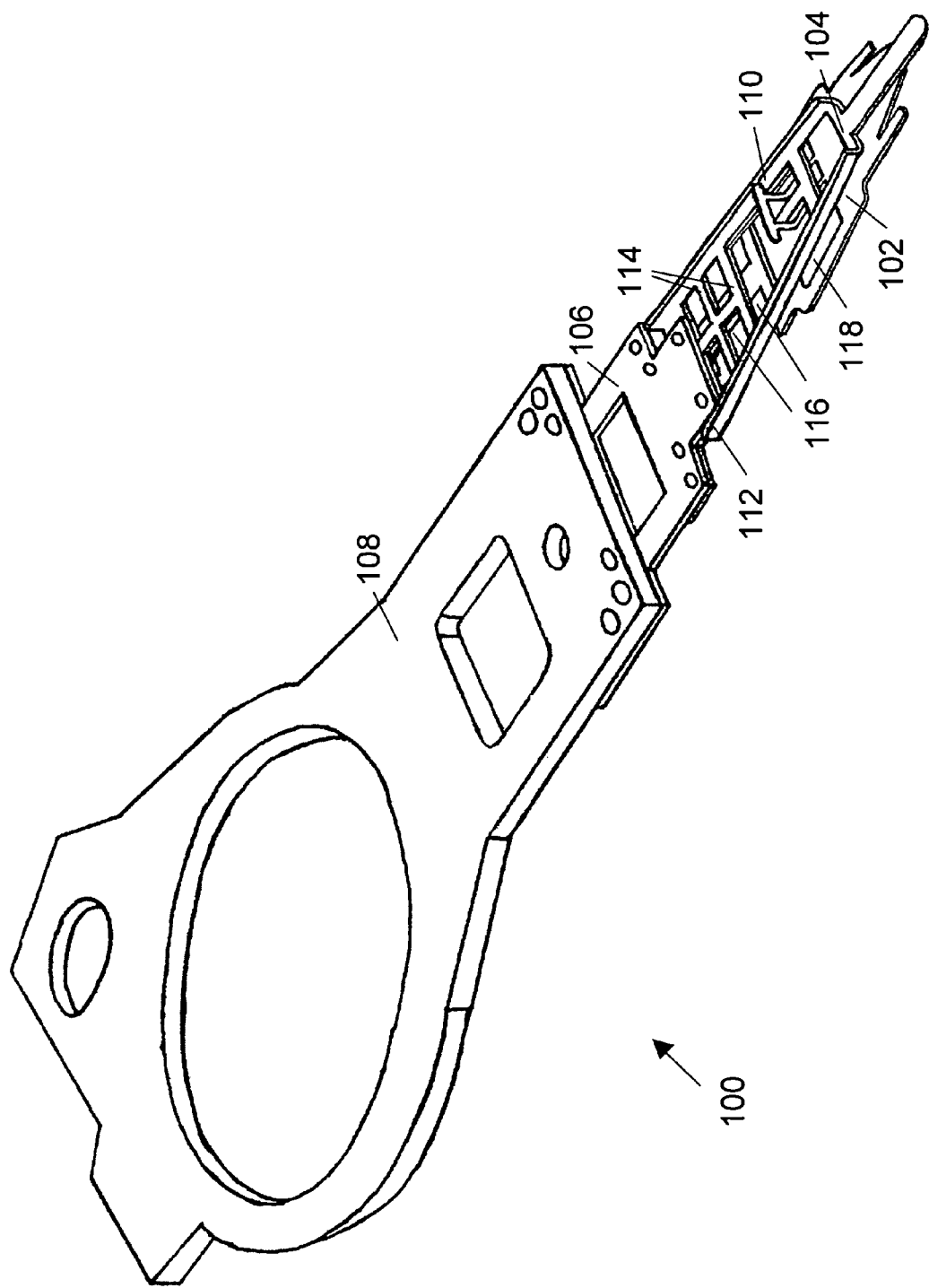
FIG. 1 shows an oblique view of one embodiment of a disk drive suspension according to the present invention.

With reference now to the drawings in detail, FIG. 1 is an oblique view of a disk drive suspension 100 in accordance with an embodiment of the invention. Disk drive suspension 100 includes a flexure 102, a load beam 104, and a baseplate 106. Baseplate 106 is attached to an actuator arm 108. Load beam 104 is coupled to baseplate 106. Flexure 102 is coupled to load beam 104. Load beam 104 is a substantially planar structural element and includes a first longitudinal edge 110 and a second longitudinal edge 112, one or more transverse members 114, and one or more hollow areas 116. First longitudinal edge 110 and second longitudinal edge 112 extend in a substantially longitudinal direction from a distal end of baseplate 106. Longitudinal edges 110 and 112 may each also comprise a portion that curves vertically in a direction normal to the load beam plane, as shown, for added stiffness. First longitudinal edge 110 and second longitudinal edge 112 are separated by one or more transverse members 114. Transverse members 114, first longitudinal edge 110, and second longitudinal edge 112 form borders for one or more hollow areas 116. Flexure 102 is a substantially planar structural element and extends in a substantially longitudinal direction with respect to actuator 108. Flexure 102 comprises at least one hollow area 118.

Figure 2:
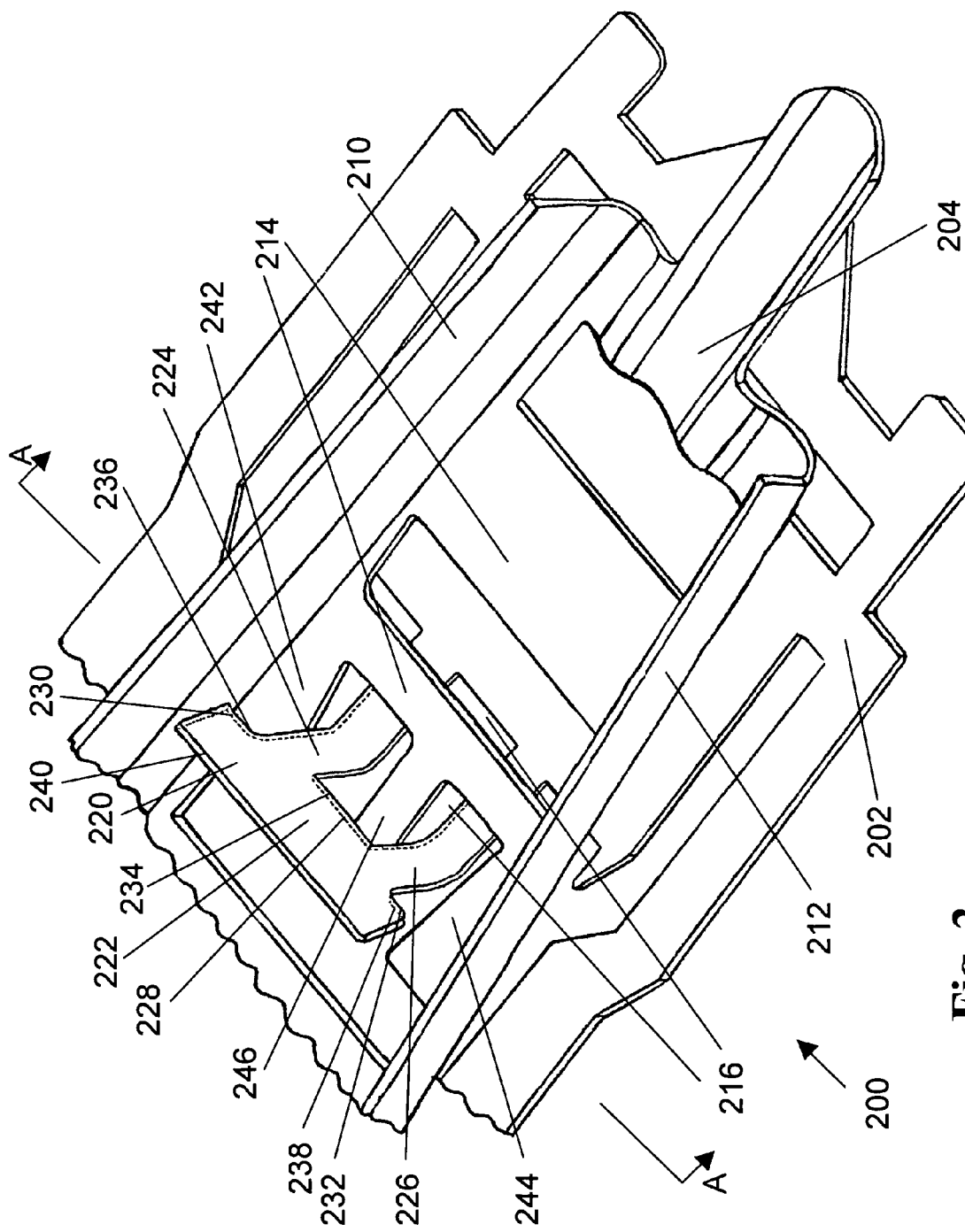
FIG. 2 shows one embodiment of a disk drive suspension according to the invention, with a double tee configuration on a flexure.

FIG. 2 illustrates another embodiment 200 of a disk drive suspension according to the invention. FIG. 2 may be considered a magnified view of the distal end of the embodiment shown in FIG. 1. Disk drive suspension 200 includes a flexure 202 and a load beam 204. Flexure 202 includes a double tee shape 220 that extends at an angle in a vertical direction with respect to the horizontal flexure plane. Double tee shape 220 includes a cross member 222, a first leg 224, and a second leg 226. Cross member 222 includes a center limiter 228, a second limiter 230, and a third limiter 232. Center limiter 228 is located between first leg 224 and second leg 226. Second limiter 230 and third limiter 232 are located at each end of cross member 222. Load beam 204 includes a first longitudinal edge 210, a second longitudinal edge 212, one or more transverse members 214, and one or more hollow areas 216. First longitudinal edge 210, second longitudinal edge 212, and one or more transverse members 214 form borders for one or more hollow areas 216. Load beam 204 further includes a first tab 242, a second tab 244, and a tongue 246. First tab 242, second tab 244 and tongue 246 each form an engagement surface, as shown. First tab 242 and second tab 244 extend in a direction substantially transverse to first longitudinal edge 210 and second longitudinal edge 212. Tongue 246 is an element extending in a substantially longitudinal direction from one transverse member 214 into one hollow area 216.

Limiting pairs are formed between a limiter and a tab (or tongue). Center limiter 228 and tongue 246 form a first limiting pair. Second limiter 230 and tab 242 form a second limiting pair. Third limiter 232 and tab 244 form a third limiting pair. Further, when there is no load on flexure 202, there exists a clearance between center limiter 228 and tongue 246, between second limiter 230 and tab 242, and between third limiter 232 and tab 244.

Cross member 222 has a first edge 234, a second edge 236, a third edge 238, and a fourth edge 240. The clearance of the first limiting pair is determined by the vertical distance from tongue 246 to first edge 234. The clearance of the second limiting pair is the vertical distance from tab 242 to second edge 236. The clearance of the third limiting pair is the vertical distance from tab 244 to third edge 238. In one embodiment of the invention, the width of center limiter 228 (i.e. the distance from first edge 234 to fourth edge 240) is greater than the width of second limiter 230 (i.e. the distance from second edge 236 to fourth edge 240) and is also greater than the width of third limiter 232 (i.e. the distance from third edge 238 to fourth edge 240). Therefore, the clearance of the first limiting pair (between first edge 234 and tongue 246) is less than the clearance of either the second or third limiting pair. Given this configuration, the first limiting pair will be the first to engage in response to shock. This is because during a shock, load is exerted on flexure 202, which in turn, causes a vertical movement of flexure 202. As shock load increases, each limiting pair gradually engages because its engagement surface and limiter are displaced vertically along the shock vector. Thus the first limiting pair, having the least vertical clearance, will engage before engagement of the second and third limiting pairs.

The initial engagement of the first limiting pair is the first step in the multi-step shock limitation. The initial engagement places the load substantially upon center limiter 228 and tongue 246, which react by damping the shock according to a counteracting spring force, F1. Those skilled in the art will recognize that F1 is a function of the interaction of the two springs, and the extent to which each spring affects the overall spring force F1 is determined according to the material composition and dimensions of each. In one embodiment, flexure 202 may be softer, more pliant, and/or dimensionally thinner than load beam 204. In this case, force F1 is primarily a function of the spring constant associated with center limiter 228. To a lesser degree, F1 is also affected by a bending of tongue 246. In other embodiments, flexure 202 and load beam 204 may be designed such that the spring constant of an engagement surface formed on the load beam is negligible. Or, engagement surfaces formed on load beams may contribute more significantly to the counteracting spring force.

If the shock is of higher magnitude, i.e. if spring force F1 is insufficient to entirely counteract the shock, the vertical displacement of flexure 202 will force the second and third limiting pairs to engage, substantially simultaneously. When these limiting pairs engage, the second step in the multi-step shock limitation occurs. At this point, the shock load is redistributed over center limiter 228, to second limiter 230, and to third limiter 232. The counteracting spring force F2 of the second limiting pair and the counteracting spring force F3 of the third limiting pair combine with F1 to further dampen the shock. Like F1, forces F2 and F3 are a determined according to the interacting springs of their corresponding limiting pairs. In another embodiment, F2 and F3 are primarily a function of the spring constant associated with second limiter 230 and third limiter 232, respectively. In another embodiment, the second and third limiting pairs are designed to abruptly arrest the displacement of flexure 202 without substantially bending, thereby anchoring the flexure to the load beam and ending the multi-step sequence at the second step.

In another embodiment, no two of three limiting pairs engage simultaneously. A shock exceeding a magnitude sufficient to fully engage the first two limiting pairs causes the third limiting pair to engage, in which case a third step in the multi-step shock limitation occurs. In the third step, the shock load is further redistributed among all engaged pairs.

In the above embodiments, a final step occurs when all limiting pairs are fully engaged, thereby substantially anchoring flexure 202 to load beam 204 and limiting the vertical movement of the flexure. Those skilled in the art will readily see that many embodiments of this invention are possible which employ a plurality of limiting pairs having staggered clearances, spring constants, or other material or dimensional variations to create as many steps as desired. By redistributing the load in multi-step fashion, a suspension system according to the invention is able to employ one or more low-range limiters for lower magnitude shock, and protect the low range limiters by employing higher ranger limiters for higher magnitude shock. This provides a smooth response over a greater range of shock input, resulting in a higher overall shock rating for the system. In addition, the risk of damage to any single component is reduced because the system redistributes higher magnitude shock among a plurality of limiters. System reliability and service life is therefore improved. Moreover, these advantages may be realized through forming techniques, without adding additional mass to the system.

Figure 7:
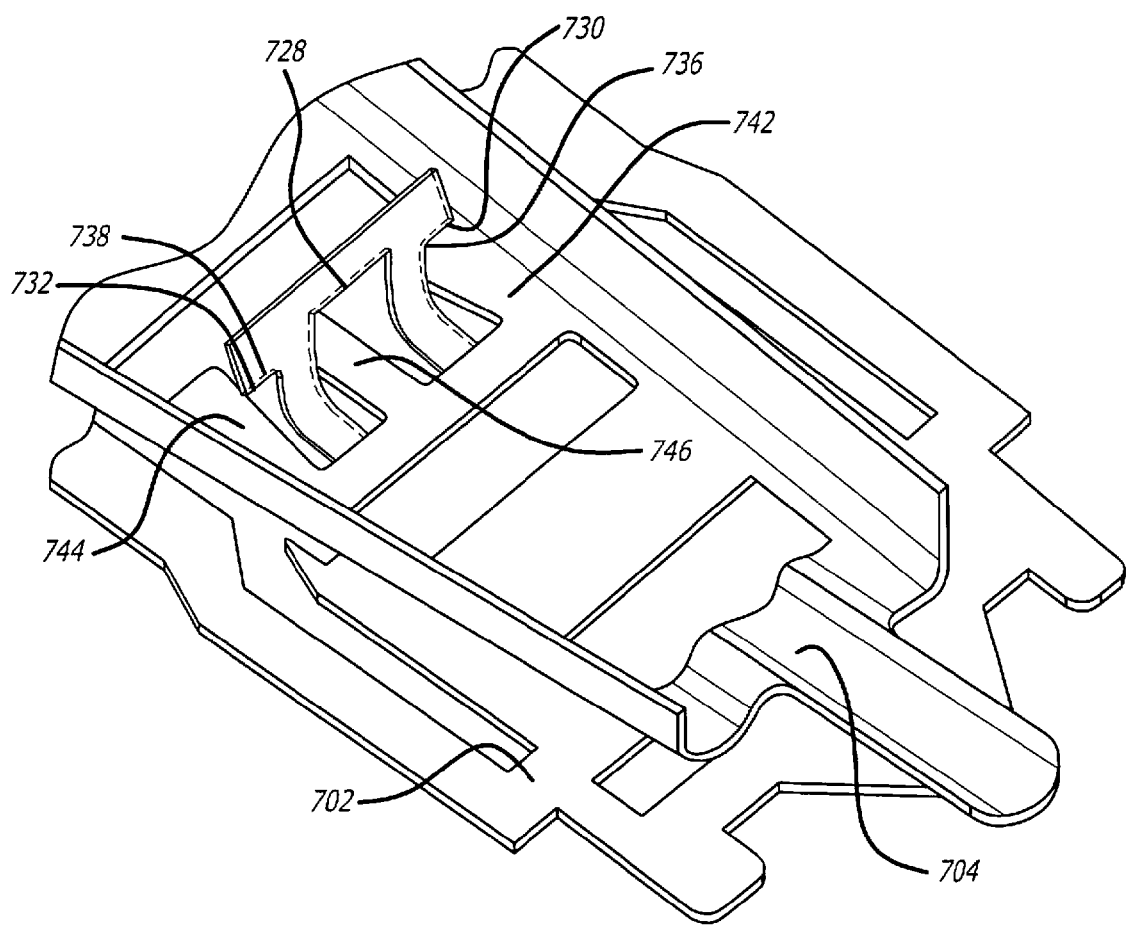
FIG. 7 shows another embodiment of the disk drive suspension according to the invention which is similar to the embodiment of FIG. 2, but with the displacement of the center limiter being greater than the displacement of the end limiters.

In another embodiment of the invention, the displacement of edge 228 from tongue 246 is greater than the displacement of either edge 236, 238 from its corresponding tab 242, 244. This embodiment is illustrated in FIG. 7, wherein the displacement of edge 728 from tongue 746 is greater than the displacement of either edge 736, 738 from its corresponding tab 742, 744. Therefore, the first limiting pair comprising center limiter 728 and tongue 746 has a clearance greater than the clearance of the other limiting pairs. In a shock condition, a load causing vertical movement of flexure 702 will force engagement of the second and/or third limiting pairs before engagement of the first limiting pair. The engagement of at least one of second limiter 730 and third limiter 732 with tab 742 and tab 744, respectively, redistributes and dampens the load exerted by the shock. The engagement of center limiter 728 and tongue 746 represents the final step in the multi-step action. In one implementation, the second and third limiting pairs engage substantially simultaneously in one step. In another implementation, the three limiting pairs engage at different times comprising three steps. In another implementation, the first two limiting pairs act as springs until the third limiting pair engages to abruptly limit vertical movement of flexure 702 and substantially anchor flexure 702 to load beam 704.

In another embodiment of the invention, the clearance between second limiter 230 and tab 242 is not equal to the clearance between third limiter 232 and tab 244. In a dual-step embodiment of the invention, the clearance between second limiter 230 and tab 242 may be equal to the clearance between third limiter 232 and tab 244. In this configuration, double tee shape 220, comprising center limiter 228, second limiter 230 and third limiter 232, cooperate with tongue 246, tab 242, and tab 244, respectively, to form a dual-step shock limiter for limiting shock in disk drive suspension 200.

Figure 3:
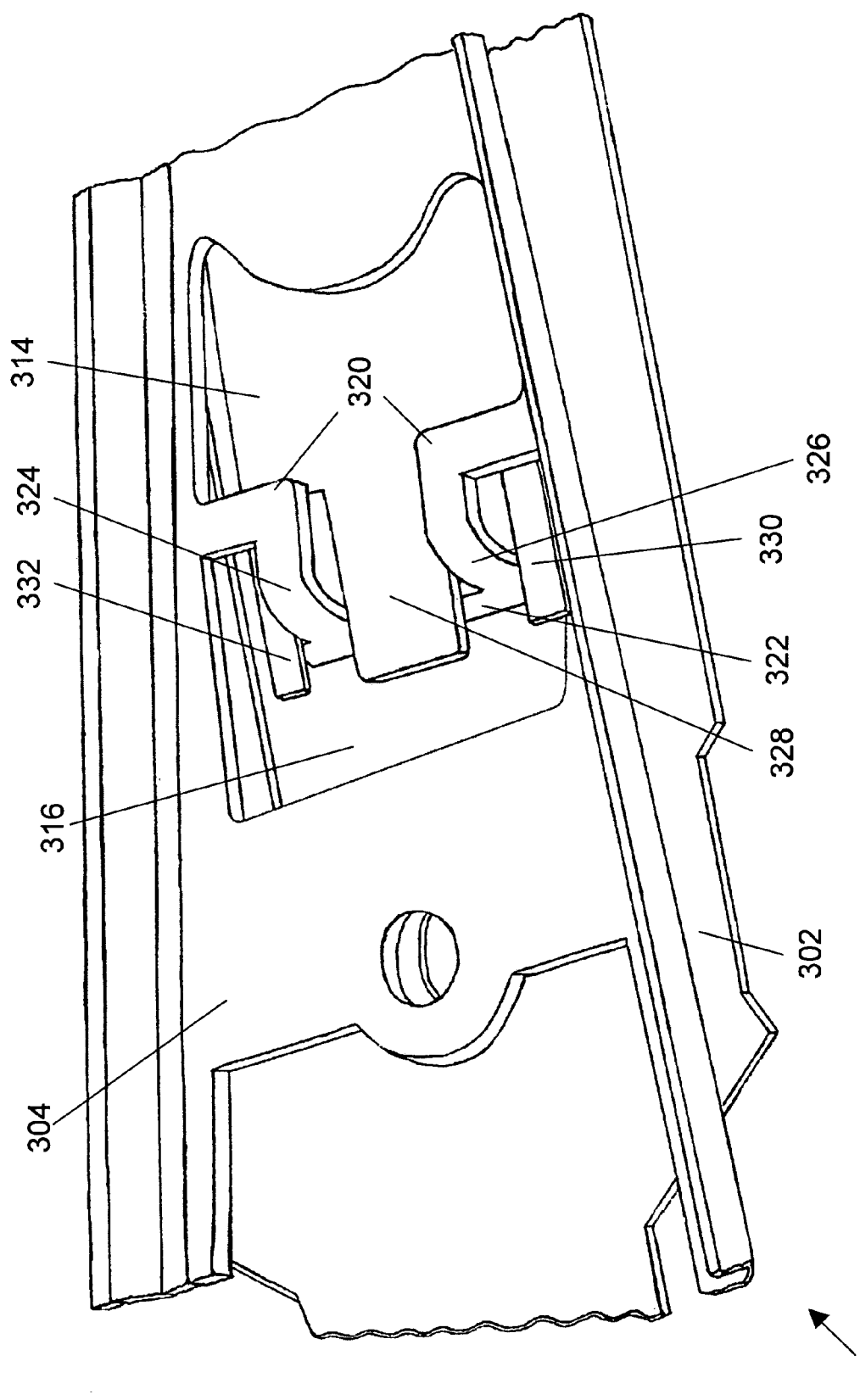
FIG. 3 shows another embodiment of a disk drive suspension with a double tee configuration on a load beam.

FIG. 3 is an oblique, partial view of a disk drive suspension 300, in accordance with another embodiment of the invention. Disk drive suspension 300 includes a flexure 302 and a load beam 304. Note that in this embodiment, the double tee shape 320 is attached to, or integral to, load beam 304. Flexure 302 comprises a center limiter 328, a second limiter 330, a third limiter 332, one or more transverse members 314, and one or more hollow areas 316. Each limiter comprises a tongue attached to, or integral to, flexure 302, and each extends in a substantially longitudinal direction from transverse member 314 into hollow area 316, as shown. Double tee shape 320 comprises a cross member 322, a first leg 324, and a second leg 326.

Figure 4:
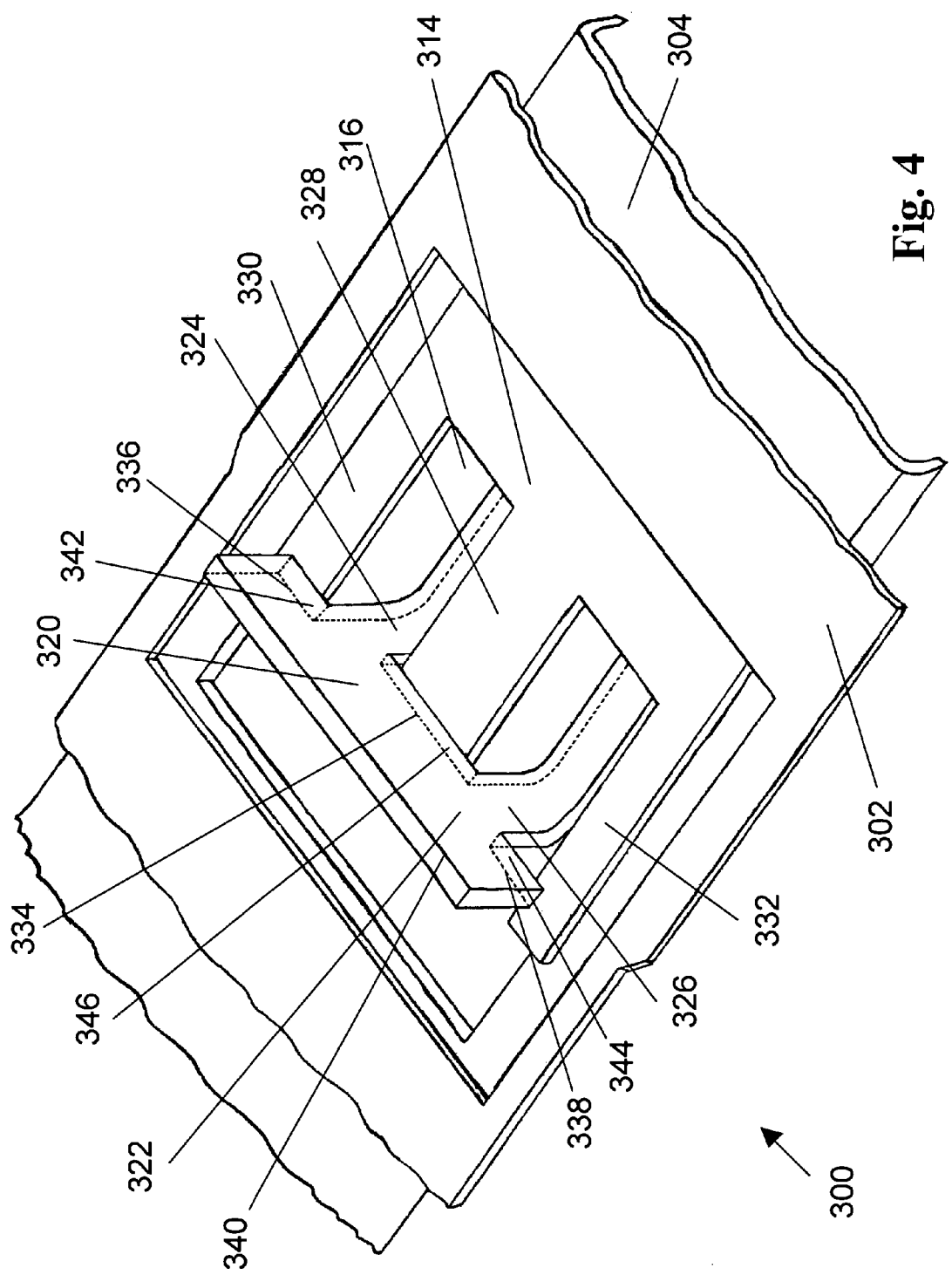
FIG. 4 shows a bottom view of a double tee configuration on a load beam in one embodiment of a disk drive suspension according to the invention.

FIG. 4 shows a bottom, partial view of disk drive suspension 300 showing cross member 322 in greater detail. Cross member 322 includes a center engagement surface 346, a second engagement surface 342 and a third engagement surface 344. Center engagement surface 346 is located between first leg 324 and second leg 326. Second engagement surface 342 and third engagement surface 344 are located at opposite ends of cross member 322.

Center engagement surface 346 and center limiter 328 form a first limiting pair. Second engagement surface 342 and second limiter 330 form a second limiting pair. Third engagement surface 344 and third limiter 332 form a third limiting pair. Further, when there is no load on flexure 302, there exists a clearance between the engagement surface and limiter of each limiting pair.

Cross member 322 has a first edge 334, second edge 336, a third edge 338 and a fourth edge 340. The clearance of the first (center) limiting pair is determined by the vertical distance from center limiter 328 to first edge 334. The clearance of the second limiting pair is the vertical distance from second limiter 330 to second edge 336. The clearance of the third limiting pair is the vertical distance from third limiter 332 to third edge 338.

The clearance of any limiting pair may be established by forming the load beam and flexure according to techniques well known in the art. For example, double tee shape may be formed to extend at an angle from the flexure or load beam plane in order to place the engagement surfaces at a desired distance from their corresponding limiters in a no-load or shelf condition. The dimensions of the double tee cross member, legs, engagement surfaces and limiters also affect clearance. In one embodiment, a center engagement surface on a double tee forms a limiting pair having the least amount of clearance. In another embodiment, a center engagement surface forms a limiting pair having the greatest amount of clearance. In other embodiments, two or more limiting pairs may have substantially equivalent, or substantially different clearances. Skilled artisans will recognize that many other embodiments are possible in which different clearances may be established by varying the position of one or more limiters or engagement surfaces with respect to a flexure or load beam plane, or by varying the widths or thicknesses of these same elements.

Figure 5A:
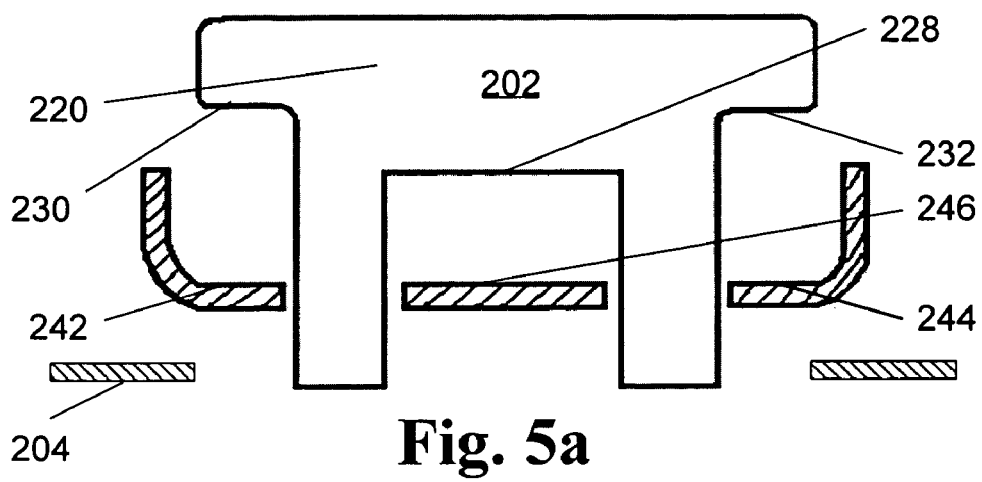
FIGS. 5a, 5b, and 5c illustrate three cross-sectional side views of a portion of the disk drive suspension of FIG. 2, as viewed along lines A-A of FIG. 2.
Figure 5B:
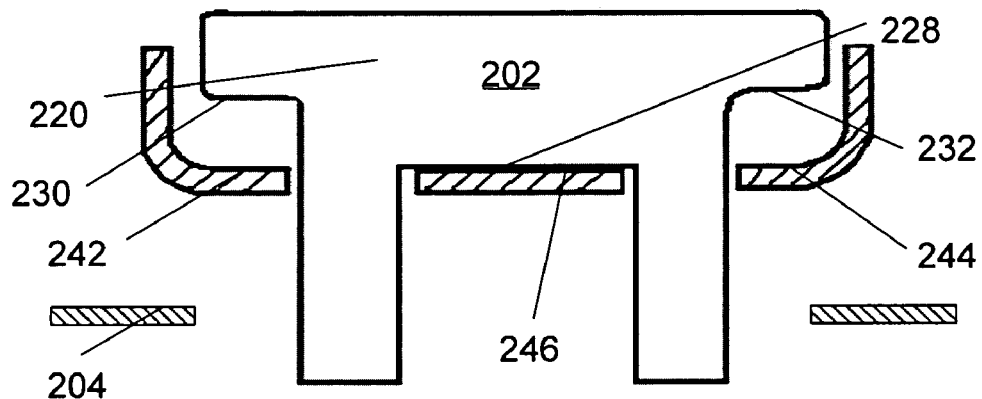
Figure 5C:
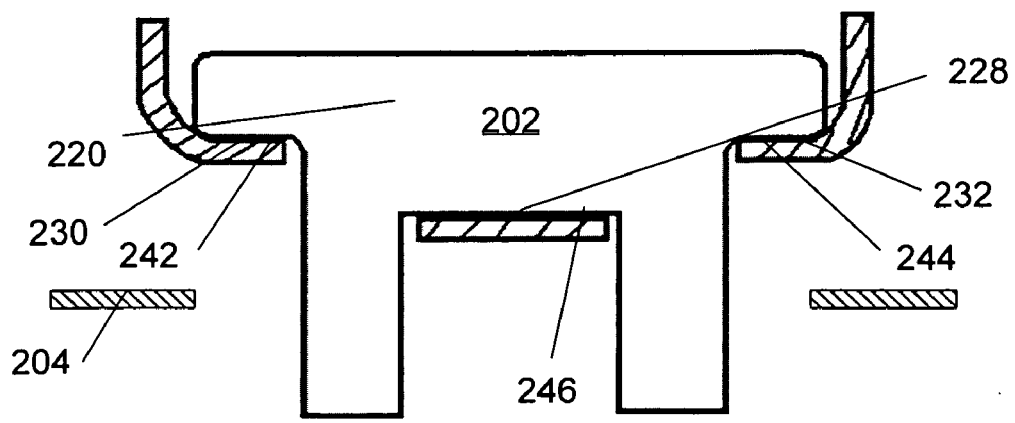

FIGS. 5a, 5b, and 5c illustrate cross-sectional side views of a portion of disk drive suspension 200 as shown in FIG. 2, as viewed along lines A-A of FIG. 2. FIGS. 5a, 5b, and 5c illustrate three engagement positions of double tee shape 220 and corresponding engagement surfaces of a multi-step shock limiter. FIG. 5a includes double tee shape 220, tab 242, tab 244, and tongue 246. In a condition of no load on flexure 202, there is no engagement of the limiters and the engagement surfaces. During a shock, load is exerted on flexure 202, which causes a vertical movement of flexure 202 in a first direction being a downward direction in the figure. As the load increases causing timber movement of flexure 202, center limiter 228 engages with tongue 246, as shown in FIG. 5b. This first engagement step causes tongue 246 to deflect to a deflected position and dampen the shock. Tongue 246 therefore defines a flexible engaging surface. Subsequently, as the load further increases and flexure 202 moves still further downward, the second engagement step occurs wherein second limiter 230 and third limiter 232 engage with tab 242 and tab 244, respectively, as shown in FIG. 5c, while tongue 246 remains in its deflected state. This second engagement step substantially anchors flexure 202 onto load beam 204, thereby limiting the vertical movement of flexure 202.

In accordance with various aspects of the invention, a method for manufacturing a shock limiter in a disk drive head suspension assembly is provided. The disk drive head suspension assembly includes a flexure and a load beam. The method comprises forming at least one engagement surface on the load beam, forming of a plurality of limiters on the flexure, and coupling the load beam to the flexure to create two or more limiting pairs, each limiting pair comprising a limiter vertically displaced from an engagement surface by a clearance.

Figure 6:
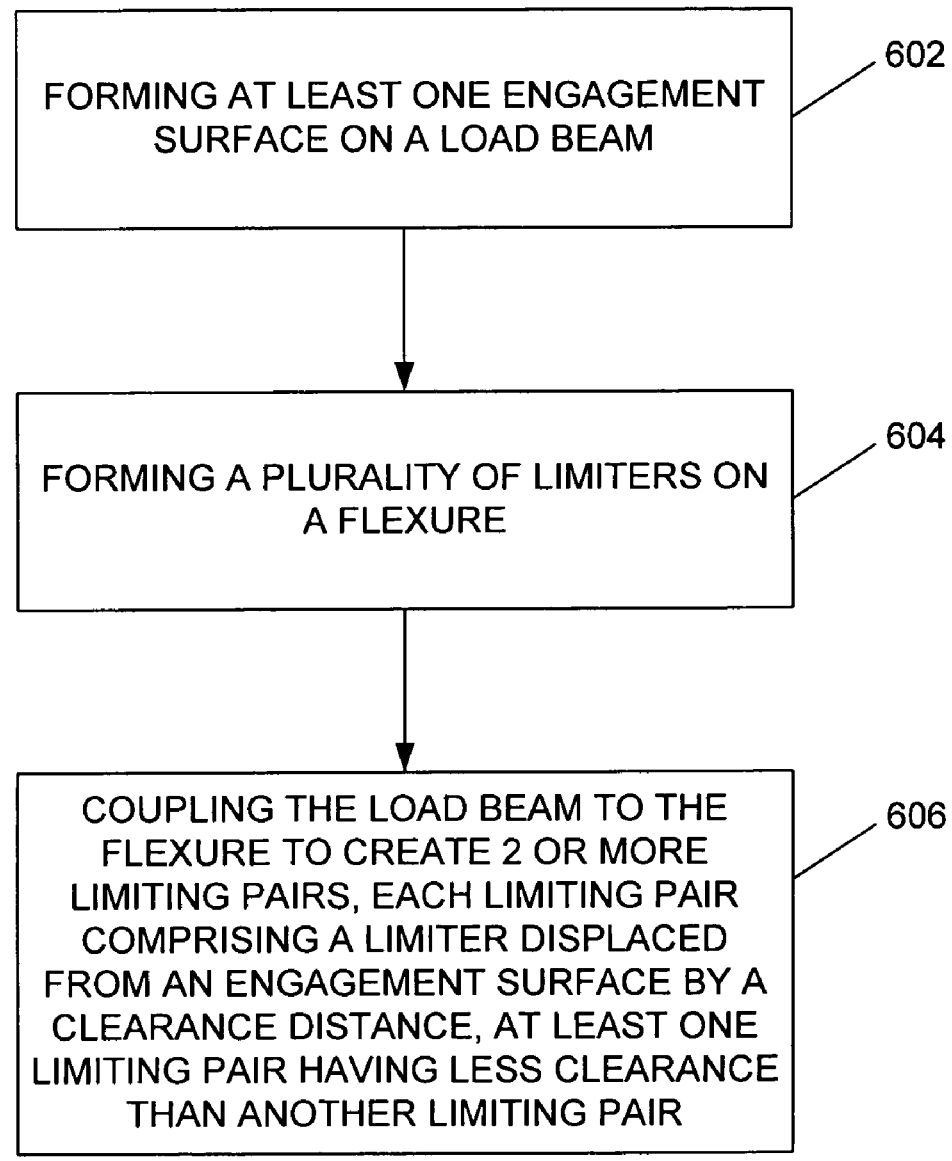
FIG. 6 shows one embodiment of a method for manufacturing a multi-step to shock limiter in a disk drive head assembly according to the invention.

FIG. 6 is a flowchart illustrating one embodiment of a method 600 according to the invention for manufacturing a multi-step shock limiter in a disk drive head assembly comprising a flexure and a load beam. The method begins with step 602, which comprises forming at least one engagement surface on the load beam. In one implementation, the at least one engagement surface may comprise a tongue or tab attached to a transverse or longitudinal edge of the load beam. In another implementation, the at least one engagement surface may be formed as an element integral to the load beam. In another implementation, the load beam is substantially planar, and the at least one engagement surface may be formed on a double tee cross member extending at an angle with respect to the load beam plane. The next step is step 604. At step 604, a plurality of limiters is formed on the flexure such that each limiter corresponds to an engagement surface. Furthermore, each limiter and its corresponding engagement surface form a limiting pair. A limiter may either be formed integrally from the flexure or be mechanically attached thereto. A limiter may be formed as a tongue or tab extending from a transverse or longitudinal edge of the flexure. In another implementation, one or more limiters may be formed from a double tee configuration, as described in the various preceding embodiments. A limiter may also be formed to extend vertically at an angle with respect to a horizontal flexure plane.

The next step 606 comprises coupling the flexure and load beam such that each limiter forms a limiting pair with an engagement surface. In one implementation, this step comprises attaching the flexure to the load beam such that each limiter is vertically displaced from its engagement surface by a clearance distance. In another implementation, this step comprises coupling the flexure to the load beam such that the clearance of at least one limiting pair is less than the clearance of any other limiting pair. In another implementation, this step further comprises coupling the flexure to the load beam such that under a shock condition, at least one limiting pair will engage prior to engagement of any other limiting pair.

The various embodiments of the present invention provide a disk drive suspension for limiting shock, using a multi-step shock limiter. The first engagement in the multi-step shock limiting process allows a small deflection of a limiter, and provides a damping effect to the shock. Subsequent engagements further dampen the shock and eventually substantially anchor the flexure onto the load beam, thereby limiting the vertical movement of read/write heads mounted on the flexure. This improved design reduces the risk of damage to the limiters, and limits the vertical movement of the flexure in conditions of shock to prevent damage to the disk surface.

While various embodiments of the invention have been illustrated and described, it will be apparent to those of ordinary skill in the art that many more embodiments and implementations are possible that are within the spirit and scope of this invention. Accordingly, the invention is not to be restricted except in light of the attached claims and their equivalents.

What is claimed is:

1. A suspension system for a head gimbal assembly comprising:
   a load beam;
   a flexure attached to the load beam;
   a first limiter engaging a corresponding first engaging surface when the flexure moves in a first direction relative to the load beam;
   a second limiter engaging a corresponding second engaging surface for limiting movement of the flexure in said first direction;
   wherein in response to movement of the flexure in said first direction, the first engaging surface is deflected by the first limiter to a deflected state thereby absorbing shock, and then in response to further flexure movement in said first direction, with said first engaging surface being in said deflected state, the second engaging surface engages the second limiter to further limit flexure movement in said first direction.

2. The system of claim 1 wherein one of the first limiter and the first engaging surface comprises a flexible tongue.

3. The system of claim 2 wherein the flexible tongue extends from at least one of the flexure and the load beam, the tongue bending in a vertical direction to absorb shock.

4. The system of claim 1 wherein the limiters form part of the flexure and the engaging surfaces form part of the load beam.

5. The system of claim 1 wherein the limiters form part of the load beam and the engaging surfaces form part of the flexure.

6. A suspension system for a head gimbal assembly having a multi-step limiter, comprising:
   a load beam including first and second engaging surfaces; and
   a flexure attached to the load beam, the flexure having a single extension bent at an angle to the plane of the flexure, the extension defining first and second limiters;
   wherein the first limiter and the first engaging surface define a first limiting pair for limiting movement of the flexure, and the second limiter and the second engaging surface define a second limiting pair for limiting movement of the flexure; and
   the first limiting pair has less clearance than the second limiting pair.

7. A suspension system for a head gimbal assembly comprising:
   a load beam comprising one or more engagement surfaces; and
   a flexure coupled to the load beam, the flexure comprising a plurality of limiters, each limiter corresponding to at least one engagement surface and forming therewith a limiting pair, each limiting pair having a clearance between its limiter and corresponding engagement surface, at least one limiting pair having less clearance than another limiting pair;

wherein:

movement of the flexure in a first direction causes the limiting pair having the less clearance to engage first;

additional movement of the flexure in said first direction causes a first member of said limiting pair having the less clearance to deflect thereby absorbing shock; and still further movement of the flexure in said first direction then causes another limiting pair to engage.

8. The system of claim 7 wherein said first member of said limiting pair is a cantilevered tongue extending from said flexure.

9. The system of claim 7 further comprising at least one limiting pair having a greatest clearance, whereby engagement thereof substantially anchors the flexure to the load beam.

10. The system of claim 7 wherein at least one engagement surface is integral to the load beam.

11. The system of claim 10 wherein the at least one engagement surface integral to the load beam comprises a tab extending in a direction substantially transverse from a longitudinal edge of the load beam.

12. The system of claim 7 wherein at least one limiter is integral to the flexure.

13. The system of claim 12 wherein the flexure is substantially planar, and the at least one limiter integral to the flexure comprises a tab extending at an angle with respect to the flexure plane.

14. The system of claim 7 wherein the load beam further comprises a first edge and a second edge, the edges extending in a substantially longitudinal direction, the edges being separated by one or more transverse members, the transverse members and edges bordering one or more hollow areas within the load beam.

15. The system of claim 14 wherein at least one engagement surface comprises a tab extending from one of the edges into a hollow area, the tab and a corresponding limiter forming the at least one limiting pair.

16. The system of claim 14 wherein at least one engagement surface comprises a tongue extending from a transverse member into a hollow area, the tongue and a corresponding limiter forming the at least one limiting pair.

17. The system of claim 14 wherein one of the transverse members comprises a double tee shape comprising a cross member and two legs, the cross member having a center engagement surface located between the legs, and an end engagement surface at each end of the cross member.

18. The system of claim 17 wherein the load beam is substantially planar, and wherein the double tee shape extends at an angle with respect to the load beam plane.

19. The system of claim 17 wherein the at least one limiting pair includes the center engagement surface, and the other limiting pair includes an end engagement surface.

20. The system of claim 17 wherein the at least one limiting pair includes an end engagement surface, and wherein the other limiting pair includes the center engagement surface.

21. The system of claim 7 wherein the flexure comprises a substantially planar structural element extending in a substantially longitudinal direction and forming at least one hollow area.

22. The system of claim 21 wherein the one or more limiters comprise two end tongues mad a center tongue, each tongue extending in a longitudinal direction into the at least one hollow area.

23. The system of claim 7 wherein the one or more engagement surfaces comprise at least one tab and at least one tongue, each tab extending in a direction substantially transverse from a longitudinal edge of the load beam, the tongue extending in a substantially longitudinal direction from a transverse member of the load beam, and the plurality of limiters comprises a double tee shape comprising a cross member and two legs, the cross member having a center limiter located between the legs, and an end limiter at each end of the cross member.

24. The system of claim 7 wherein the one or more engagement surfaces comprise a double tee shape extending at an angle from a transverse member of the load beam, the shape comprising a cross member and two legs, the cross member having a center engagement surface located between the legs, and an end engagement surface at each end of the cross member and the plurality of limiters comprises a plurality of tongues extending in a longitudinal direction from the load beam.

25. A disk drive including the suspension system of claim 7.

26. A suspension system for a head gimbal assembly comprising:

a load beam comprising one or more engagement surfaces; and a flexure coupled to the load beam, the flexure comprising a plurality of limiters, each limiter corresponding to at least one engagement surface and forming therewith a limiting pair, each limiting pair having a clearance between its limiter and corresponding engagement surface, at least one limiting pair having less clearance than another limiting pair;

wherein:

the flexure comprises a substantially planar structural element extending in a substantially longitudinal direction and forming at least one hollow area; and the flexure further comprises a double tee shape extending into the at least one hollow area at an angle with respect to the flexure plane, the shape comprising a cross member and two legs, the cross member having a center limiter located between the legs, and an end limiter at each end of the cross member.

27. The system of claim 26 wherein the at least one limiting pair includes the center limiter, and the other limiting pair includes an end limiter.

28. The system of claim 26 wherein the at least one limiting pair includes an end limiter, and the other limiting pair includes the center limiter.

29. In a disk drive head suspension assembly comprising a flexure coupled to a substantially planar load beam, a multi-step shock limiter comprising:

a double tee shape formed on the load beam, and extending at an angle with respect to the load beam plane, the shape comprising a cross member and two legs, the cross member having a center engagement surface located between the legs, and an end engagement surface at each end of the cross member; and a plurality of limiters formed on the flexure, each limiter corresponding to an engagement surface and forming therewith a limiting pair, each limiting pair having a clearance between its limiter and corresponding engagement surface, at least one limiting pair having less clearance than another limiting pair;

wherein responsive to external shock, the at least one limiting pair engages before engagement of another limiting pair.

30. The system of claim 29 further comprising at least one limiting pair having a greatest clearance, whereby engagement thereof substantially anchors the flexure to the load beam.

31. The system of claim 29 wherein the flexure is substantially planar, and at least one limiter comprises a tongue extending into a hollow area of the load beam.

32. The system of claim 29 wherein the at least one limiting pair includes the center engagement surface, and the other limiting pair includes an end engagement surface.

33. The system of claim 29 wherein the at least one limiting pair includes an end engagement surface, and the other limiting pair includes the center engagement surface.

34. A disk drive including the suspension assembly of claim 29.

35. In a disk drive head suspension assembly comprising a substantially planar flexure coupled to a load beam, a multi-step shock limiter comprising:
  a plurality of engagement surfaces formed on the load beam; and
  a double tee shape formed on the flexure and extending at an angle with respect to the flexure plane, the shape comprising a cross member and two legs, the cross member having a center limiter located between the legs, and an end limiter at each end of the cross member, each limiter corresponding to an engagement surface and forming therewith a limiting pair, each limiting pair having a clearance between its limiter and corresponding engagement surface, at least one limiting pair having less clearance than another limiting pair;
  wherein responsive to external shock, the at least one limiting pair engages before engagement of another limiting pair.

36. The multi-step shock limiter of claim 35 further comprising at least one limiting pair having a greatest clearance, whereby engagement thereof substantially anchors the flexure to the load beam.

37. The multi-step shock limiter of claim 35 wherein the at least one limiting pair includes the center limiter, and the other limiting pair includes an end limiter.

38. The multi-step shock limiter of claim 35 wherein the at least one limiting pair includes an end limiter, and the other limiting pair includes the center limiter.

* * * * *

UNITED STATES PATENT AND TRADEMARK OFFICE
CERTIFICATE OF CORRECTION

| | | |
|---|---|---|
| PATENT NO. | : 7,719,797 B1 | Page 1 of 1 |
| APPLICATION NO. | : 11/199801 | |
| DATED | : May 18, 2010 | |
| INVENTOR(S) | : Shijin Mei | |

It is certified that error appears in the above-identified patent and that said Letters Patent is hereby corrected as shown below:

In claim 22, column 11, line 65, delete "mad" and insert -- and --.

Signed and Sealed this

Twenty-second Day of June, 2010

David J. Kappos
*Director of the United States Patent and Trademark Office*